(12) United States Patent
Sanada et al.

(10) Patent No.: US 10,044,281 B2
(45) Date of Patent: Aug. 7, 2018

(54) BIDIRECTIONAL INSULATED DC/DC CONVERTER AND SMART NETWORK USING THE SAME

(71) Applicants: TOSHIBA MITSUBISHI-ELECTRIC INDUSTRIAL SYSTEMS CORPORATION, Chuo-ku (JP); The Ritsumeikan Trust, Kyoto-shi (JP)

(72) Inventors: Kazunori Sanada, Chuo-ku (JP); Hiroshi Masunaga, Chuo-ku (JP); Yoshitaka Kawabata, Kusatsu (JP); Takao Kawabata, Otsu (JP)

(73) Assignees: TOSHIBA MITSUBISHI-ELECTRICAL INDUSTRIAL SYSTEMS CORPORATION, Chuo-ku (JP); The Ritsumeikan Trust, Kyoto-shi (JP)

( * ) Notice: Subject to any disclaimer, the term of this patent is extended or adjusted under 35 U.S.C. 154(b) by 0 days.

(21) Appl. No.: 15/021,907

(22) PCT Filed: Sep. 10, 2014

(86) PCT No.: PCT/JP2014/073869
§ 371 (c)(1),
(2) Date: Mar. 14, 2016

(87) PCT Pub. No.: WO2015/056503
PCT Pub. Date: Apr. 23, 2015

(65) Prior Publication Data
US 2016/0233778 A1  Aug. 11, 2016

(30) Foreign Application Priority Data
Oct. 18, 2013  (JP) .................................. 2013-217170

(51) Int. Cl.
*H02M 3/335* (2006.01)
*H02M 1/42* (2007.01)

(52) U.S. Cl.
CPC ......... *H02M 3/33584* (2013.01); *H02M 1/42* (2013.01); *H02M 3/335* (2013.01)

(58) Field of Classification Search
CPC ..... H02M 1/42; H02M 3/335; H02M 3/33584
See application file for complete search history.

(56) References Cited

U.S. PATENT DOCUMENTS

| 6,335,871 B1 | 1/2002 | Kita et al. |
| 2008/0212340 A1 | 9/2008 | Tao et al. |
| (Continued) |

FOREIGN PATENT DOCUMENTS

| EP | 1 732 200 A1 | 12/2006 |
| JP | 2008 141918 | 6/2008 |
| (Continued) |

OTHER PUBLICATIONS

International Search Report dated Dec. 9, 2014, in PCT/JP2014/073869 filed Sep. 10, 2014.

(Continued)

*Primary Examiner* — Fred E Finch, III
*Assistant Examiner* — Rafael O De Leon Domenech
(74) *Attorney, Agent, or Firm* — Oblon, McClelland, Maier & Neustadt, L.L.P.

(57) ABSTRACT

A bidirectional insulated DC/DC converter narrows a pulse width of an AC fundamental wave voltage corresponding to a higher DC voltage of two DC voltages, to cause effective values of the AC fundamental wave voltages to coincide with each other, and then, sets a phase difference between the AC fundamental wave voltages in accordance with a value and a direction of a current that is desired to flow. Accordingly, even when the difference between the two DC (Continued)

voltages greatly varies, DC power can be stably transmitted and received.

11 Claims, 9 Drawing Sheets

(56) References Cited

U.S. PATENT DOCUMENTS

2011/0198933 A1  8/2011  Ishigaki et al.
2014/0346871 A1* 11/2014  Hirano .............. H02M 3/33584
                                                              307/24

FOREIGN PATENT DOCUMENTS

| JP | 2010 124549 | 6/2010 |
| JP | 2011 130521 | 6/2011 |
| JP | 2013 176174 | 9/2013 |
| JP | 2013 251998 | 12/2013 |

OTHER PUBLICATIONS

Office Action dated Mar. 28, 2017 in Japanese Patent Application No. 2015-542542 (with English language translation).
Extended European Search Report dated May 30, 2017 in European Patent Application No. 14854664.1.
Office Action dated Sep. 4, 2017 in Korean Patent Application No. 10-2016-7010654 (with English language translation).
Combined Office Action and Search Report dated Aug. 23, 2017 in Chinese Patent Application No. 201480056532.5 (with English language translation of Office Action and English translation of categories of cited documents).

* cited by examiner

FIG.4
(a) WHEN VA = 100, VB = 100 AND θ = 30 DEGREES
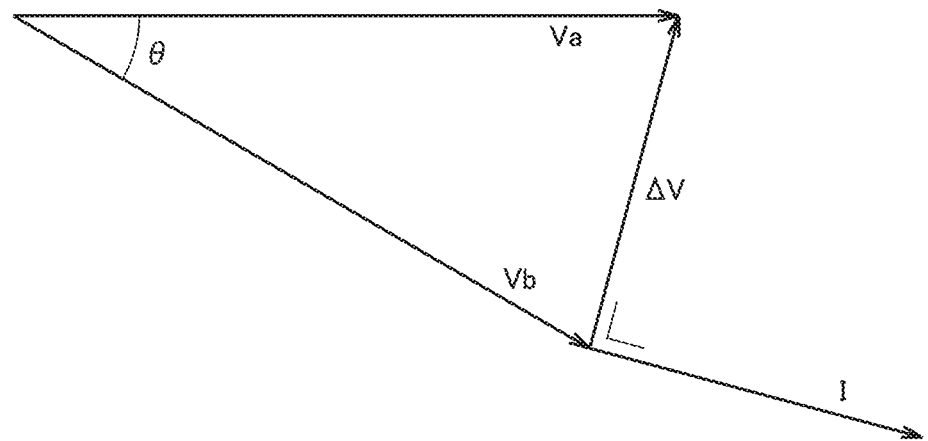
(b) WHEN VA = 100, VB = 100 AND θ = 10 DEGREES
(c) WHEN VA = 100, VB = 120 AND θ = 10 DEGREES
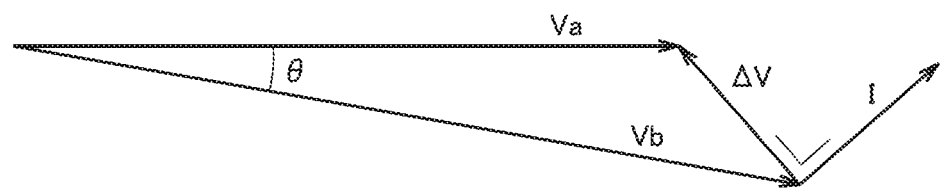
(d) WHEN VA = 100, VB = 120 AND θ = 5 DEGREES
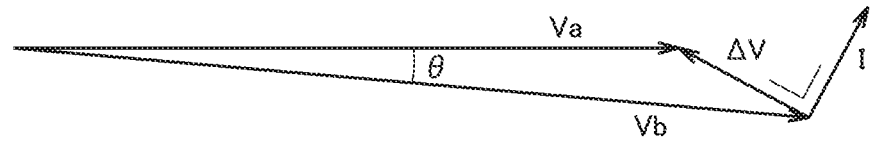

FIG.5
(a) WHEN POWER FACTORS OF Va, Vb AND I ARE DESIRED TO BE IMPROVED
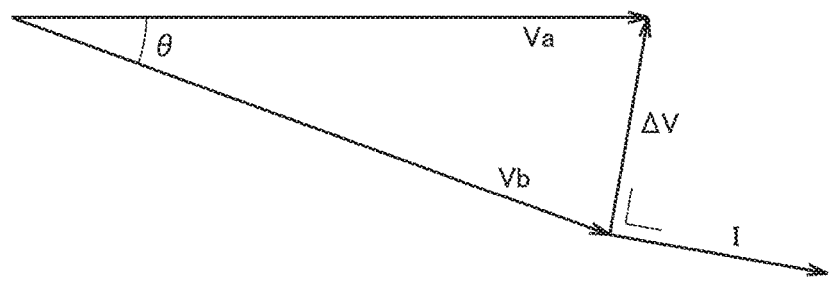
(b) WHEN POWER FACTORS OF Va AND I ARE DESIRED TO BE IMPROVED
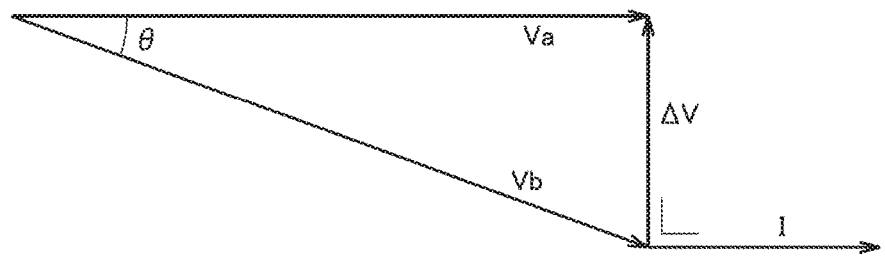
(c) WHEN POWER FACTORS OF Vb AND I ARE DESIRED TO BE IMPROVED
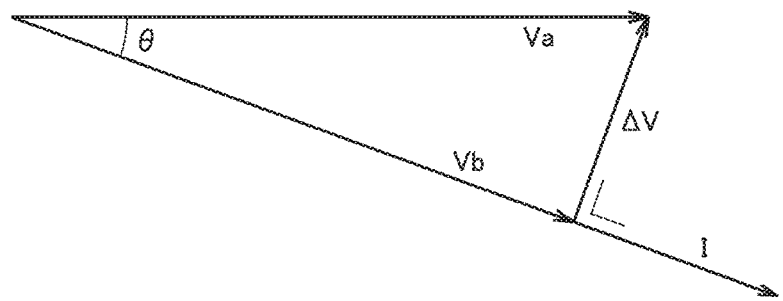

FIG.6
(a) WHEN θ = 0
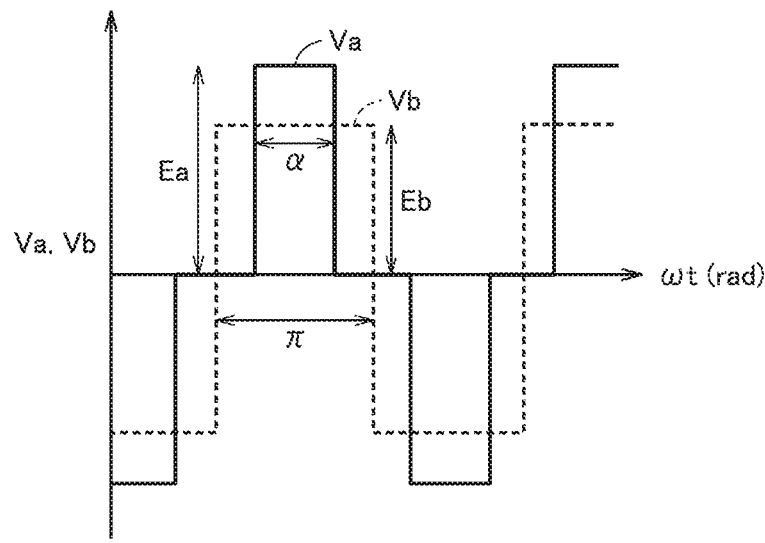
(b) WHEN θ > 0
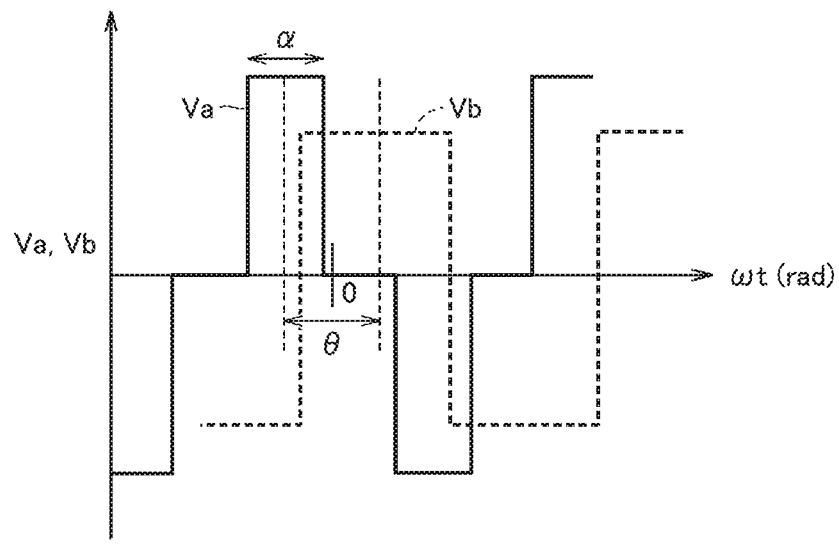

BIDIRECTIONAL INSULATED DC/DC CONVERTER AND SMART NETWORK USING THE SAME

TECHNICAL FIELD

The present invention relates to a bidirectional insulated DC/DC converter and a smart network using the same, and particularly to a bidirectional insulated DC/DC converter provided with two inverters coupled by an insulated transformer, and a smart network using the bidirectional insulated DC/DC converter.

BACKGROUND ART

In the smart network equipped with a plurality of direct-current (DC) power systems, it is necessary to supply DC power from a DC power system in which DC power is excessive to a DC power system in which DC power is insufficient. Furthermore, in each of the DC power systems, there are cases where DC power becomes excessive and also where DC power becomes insufficient. Thus, the DC voltage fluctuates. Therefore, a bidirectional insulated DC/DC converter needs to be provided between two DC power systems.

By way of example, there is a bidirectional insulated DC/DC converter including two inverters coupled by an insulated transformer (for example, see PTD 1 (Japanese Patent Laying-Open No. 2010-124549)).

CITATION LIST

Patent Document

PTD 1: Japanese Patent Laying-Open No. 2010-124549

SUMMARY OF INVENTION

Technical Problem

The conventional bidirectional insulated DC/DC converter, however, poses a problem that DC power cannot be stably transmitted and received in the case where the difference between the DC voltages of two DC power systems greatly varies.

Therefore, a main object of the present invention is to provide a bidirectional insulated DC/DC converter capable of stably transmitting and receiving DC power even when the difference between two DC voltages greatly varies, and a smart network using the bidirectional insulated DC/DC converter.

Solution to Problem

A bidirectional insulated DC/DC converter according to the present invention serves to transmit and receive DC power between a first DC circuit and a second DC circuit, and includes: a first inverter configured to generate a first alternating-current (AC) fundamental wave voltage based on a first DC voltage received from the first DC circuit; a second inverter configured to generate a second AC fundamental wave voltage that is equal in frequency to the first AC fundamental wave voltage based on a second DC voltage received from the second DC circuit; an insulated transformer including a primary winding and a secondary winding configured to receive the first AC fundamental wave voltage and the second AC fundamental wave voltage, respectively, and insulated from each other; a pulse width setting unit configured to set a pulse width of at least one of the first and second AC fundamental wave voltages based on the first and second DC voltages such that a voltage difference between the first and second AC fundamental wave voltages is smaller than a predetermined value; a phase difference setting unit configured to set a phase difference between the first and second AC fundamental wave voltages such that a desired DC power is transmitted and received between the first and second DC circuits; and a signal generation unit configured to generate a control signal for each of the first and second inverters based on setting results in the pulse width setting unit and the phase difference setting unit.

Advantageous Effects of Invention

In the bidirectional insulated DC/DC converter according to the present invention, a pulse width of at least one of the first and second fundamental wave voltages is set such that the voltage difference between the first and second AC fundamental wave voltages is smaller than a prescribed value, a phase difference between the first and second AC fundamental wave voltages is set such that a desired DC power is transmitted and received between the first and second DC circuits, and a control signal for each of the first and second inverters is generated based on setting results. Therefore, DC power can be stably supplied in a desired direction even when the difference between two DC voltages greatly varies.

BRIEF DESCRIPTION OF DRAWINGS

FIG. 4 is a diagram for illustrating the operation of a pulse width setting unit shown in FIG. 3.

FIG. 5 is another diagram for illustrating the operation of the pulse width setting unit shown in FIG. 3.

FIG. 6 is a diagram showing waveforms of two AC fundamental wave voltages shown in FIGS. 4 and 5.

DESCRIPTION OF EMBODIMENTS

First Embodiment

Figure 1:
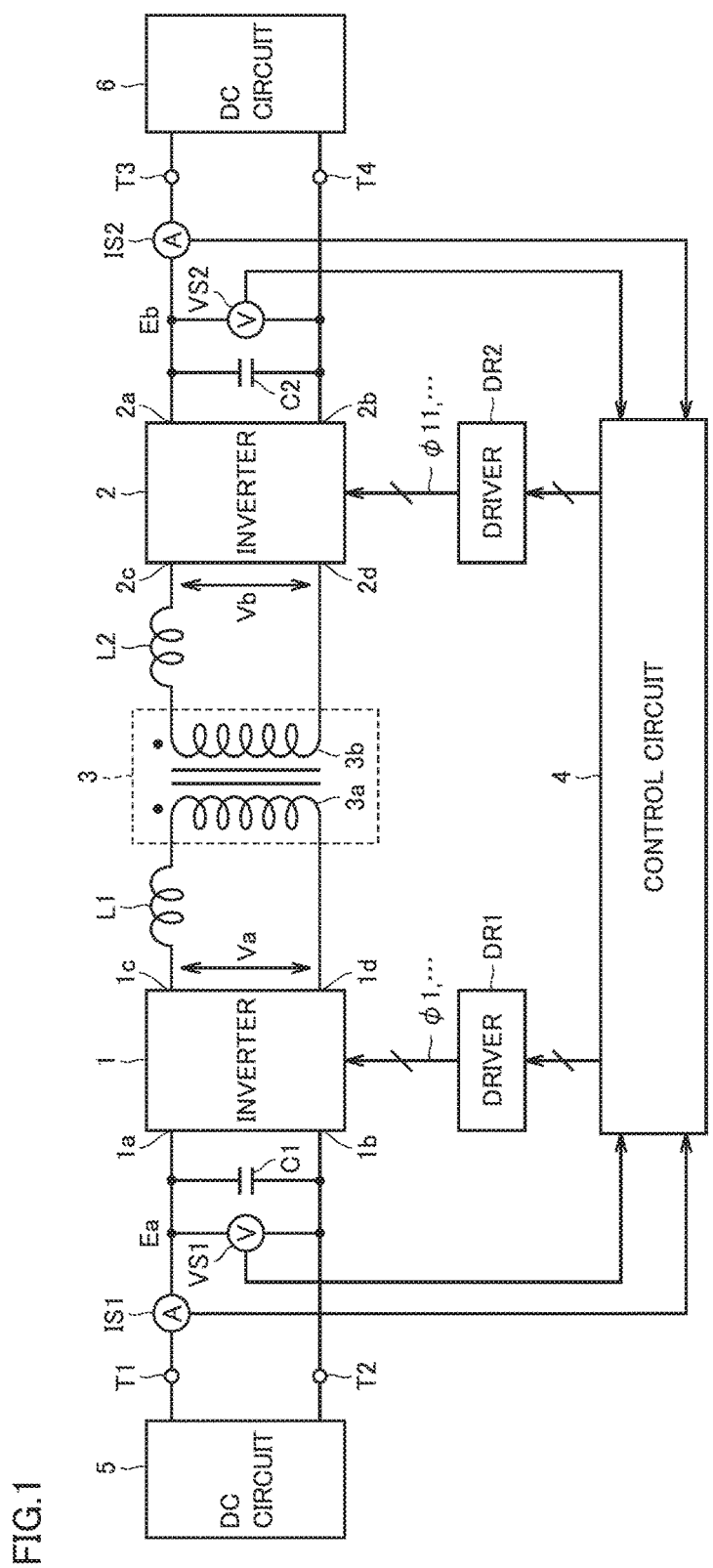
FIG. 1 is a block diagram showing the configuration of a bidirectional insulated DC/DC converter according to the first embodiment of the present invention.

FIG. 1 is a circuit block diagram showing the configuration of a bidirectional insulated DC/DC converter according to the first embodiment of the present invention. In FIG. 1, this bidirectional insulated DC/DC converter includes: positive voltage terminals T1, T3; negative voltage terminals T2, T4; current detectors IS1, IS2; voltage detectors VS1, VS2;

capacitors C1, C2; inverters 1, 2; reactors L1, L2; an insulated transformer 3; a control circuit 4; and drivers DR1, DR2.

DC circuit 5 is connected to terminals T1 and T2, and DC circuit 6 is connected to terminals T3 and T4. For example, DC circuit 5 includes a DC power supply generating DC power and a load driven by DC power, and DC circuit 6 includes a power storage device storing DC power. Examples of the DC power supply may be a solar photovoltaic power generator, a wind power generator, and the like. Examples of the power storage device may be a LiPo (lithium ion polymer) battery, an electric double layer capacitor, and the like.

When DC power is excessive in DC circuit 5, the bidirectional insulated DC/DC converter supplies the excessive amount of DC power to DC circuit 6. When DC power is insufficient in DC circuit 5, the bidirectional insulated DC/DC converter supplies DC power in DC circuit 6 to DC circuit 5. At this time, the bidirectional insulated DC/DC converter transmits and receives DC power regardless of whether a DC voltage Ea of DC circuit 5 and a DC voltage Eb of DC circuit 6 are high or low.

More specifically, insulated transformer 3 includes a primary winding 3a and a secondary winding 3b insulated from each other. Primary winding 3a and secondary winding 3b are identical in number of turns. Primary winding 3a has one terminal connected to an AC terminal 1c of inverter 1 through reactor L1 and the other terminal connected to an AC terminal 1d of inverter 1. Secondary winding 3b has one terminal connected to an AC terminal 2c of inverter 2 through reactor L2 and the other terminal connected to an AC terminal 2d of inverter 2.

Inverter 1 has a positive voltage terminal 1a connected to a positive voltage terminal T1 through current detector IS1 and a negative voltage terminal 1b connected to a negative voltage terminal T2. Current detector IS1 detects a DC current that flows between inverter 1 and DC circuit 5, and feeds a signal showing the detected value to control circuit 4. Voltage detector VS1 detects DC voltage Ea between terminals 1a and 1b of inverter 1, and feeds a signal showing the detected value to control circuit 4.

Capacitor C1 is connected between terminals 1a and 1b of inverter 1, and smoothes and stabilizes DC voltage Ea between terminals 1a and 1b. Inverter 1 is controlled by output signals $\phi 1$, . . . from driver DR1, to convert DC voltage Ea between positive voltage terminal 1a and negative voltage terminal 1b into an AC fundamental wave voltage Va, and then, and outputs the converted voltage between AC terminals 1c and 1d.

Inverter 2 has a positive voltage terminal 2a connected to a positive voltage terminal T3 through current detector IS2, and a negative voltage terminal 2b connected to negative voltage terminal T4. Current detector IS2 detects a DC current that flows between inverter 2 and DC circuit 6, and feeds a signal showing the detected value to control circuit 4. Voltage detector VS2 detects DC voltage Eb between terminals 2a and 2b of inverter 2, and feeds a signal showing the detected value to control circuit 4.

Capacitor C2 is connected between terminals 2a and 2b of inverter 2, and smoothes and stabilizes DC voltage Eb between terminals 2a and 2b. Inverter 2 is controlled by output signals $\phi 11$, . . . of driver DR2, converts DC voltage Eb between positive voltage terminal 2a and negative voltage terminal 2b into an AC fundamental wave voltage Vb, and then outputs the converted voltage between AC terminals 2c and 2d.

Control circuit 4 is formed of a microcomputer, for example, and generates control signals $\phi 1$, . . . for inverters 1 and 2 based on output signals from voltage detectors VS1, VS2 and current detectors IS1, IS2. Based on the detection results of voltage detectors VS1 and VS2, control circuit 4 sets pulse widths $\alpha$ and $\beta$ of two AC fundamental wave voltages Va and Vb such that effective values of AC fundamental wave voltages Va and Vb generated in inverters 1 and 2 coincide with each other. Furthermore, control circuit 4 sets a phase difference $\theta$ between two AC fundamental wave voltages Va and Vb such that desired DC power flows from one selected from DC circuits 5 and 6 to the other one of DC circuits 5 and 6. Furthermore, control circuit 4 generates control signals $\phi 1$, . . . for inverters 1 and 2 based on pulse widths $\alpha$ and $\beta$ and phase difference $\theta$ that have been set.

Driver DR1 amplifies control signals $\phi 1$, . . . for inverter 1 and supplies the amplified signals to inverter 1. Driver DR2 amplifies control signals $\phi 11$, . . . for inverter 2 and supplies the amplified signals to inverter 2.

Figure 2:
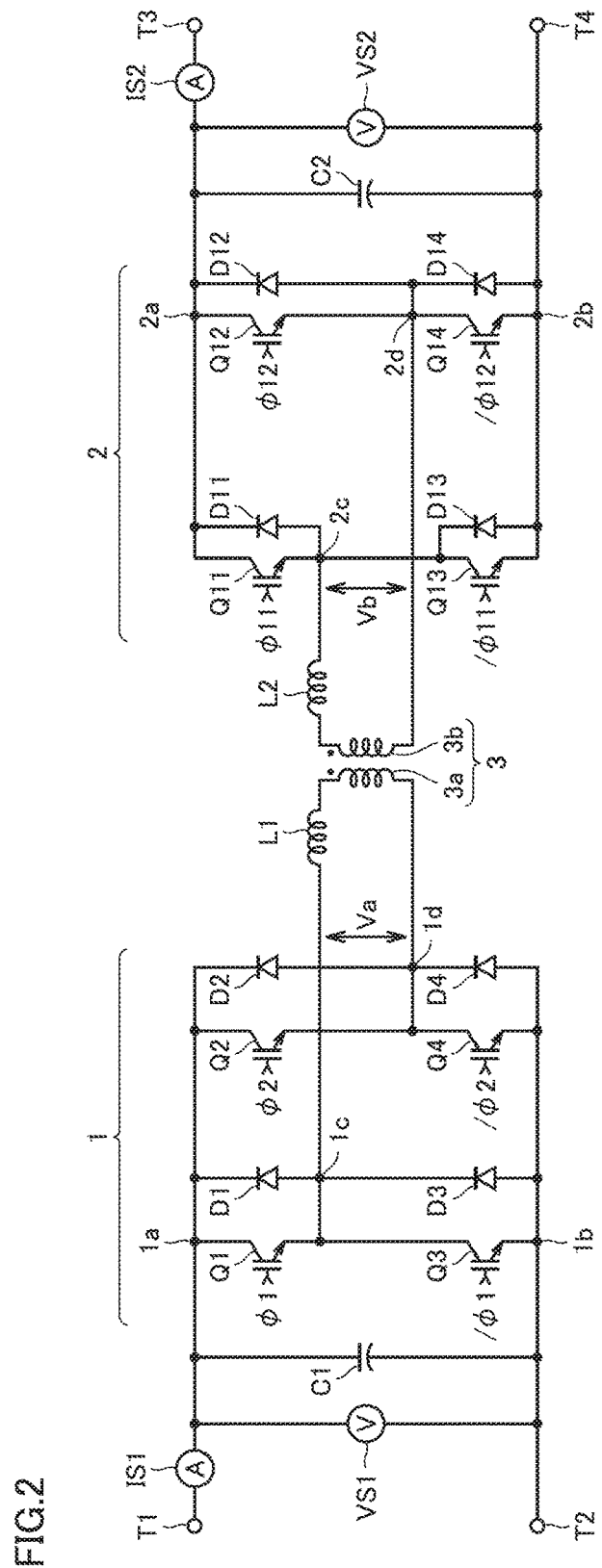
FIG. 2 is a circuit diagram showing the configuration of an inverter shown in FIG. 1.

FIG. 2 is a circuit diagram showing the configurations of inverters 1 and 2. In FIG. 2, inverter 1 includes IGBTs (Insulated Gate Bipolar Transistor) Q1 to Q4 and diodes D1 to D4. IGBTs Q1 and Q2 have collectors each connected to positive voltage terminal 1a, gates receiving control signals $\phi 1$ and $\phi 2$, respectively, and emitters connected to AC terminals 1c and 1d, respectively. IGBTs Q3 and Q4 have collectors connected to AC terminals 1c and 1d, respectively, gates receiving control signals $/\phi 1$ and $/\phi 2$, respectively, and emitters each connected to negative voltage terminal 1b. Diodes D1 to D4 are connected in anti-parallel to IGBTs Q1 to Q4, respectively.

Each of control signals $\phi 1$, $/\phi 1$, $\phi 2$, and $/\phi 2$ is a PWM (Pulse Width Modulation) signal and also is a rectangular wave signal having a predetermined frequency (for example, 10 kHz). Control signals $/\phi 1$ and $/\phi 2$ are obtained by inverting control signals $\phi 1$ and $\phi 2$, respectively. Therefore, IGBTs Q1 and Q3 are not simultaneously turned on, and IGBTs Q2 and Q4 are not simultaneously turned on.

When IGBTs Q1 and Q4 are turned on, a current flows from positive voltage terminal 1a through IGBT Q1, reactor L1, primary winding 3a and IGBT Q4 into negative voltage terminal 1b. Furthermore, when IGBTs Q2 and Q3 are turned on, a current flows from positive voltage terminal 1a through IGBT Q2, primary winding 3a, reactor L1, and IGBT Q3 into negative voltage terminal 1b. Accordingly, IGBTs Q1 to Q4 are controlled by control signals $\phi 1$, $/\phi 1$, $\phi 2$, and $/\phi 2$ to be turned on or off, so that AC power can be supplied to primary winding 3a.

Similarly, inverter 2 includes IGBTs Q11 to Q14 and diodes D11 to D14. IGBTs Q11 and Q12 have collectors each connected to positive voltage terminal 2a, gates receiving control signals $\phi 11$ and $\phi 12$, respectively, and emitters connected to AC terminals 2c and 2d, respectively. IGBTs Q13 and Q14 have collectors connected to AC terminals 2c and 2d, respectively, gates receiving control signals $/\phi 11$ and $/\phi 12$, respectively, and emitters each connected to negative voltage terminal 2b. Diodes D11 to D14 are connected in anti-parallel to IGBTs Q11 to Q14, respectively.

Control signals $\phi 11$, $/\phi 11$, $\phi 12$, and $/\phi 12$ are PWM signals and also are rectangular wave signals having the same frequencies (for example, 10 kHz) as those of control signals $\phi 1$, $/\phi 1$, $\phi 2$, and $/\phi 2$, respectively. Control signals $/\phi 11$ and $/\phi 12$ are obtained by inverting control signals $\phi 11$ and $\phi 12$, respectively. Accordingly, IGBTs Q11 and Q13 are not simultaneously turned on, and IGBTs Q12 and Q14 are not simultaneously turned on.

When IGBTs Q11 and Q14 are turned on, a current flows from positive voltage terminal 2a through IGBT Q11, reactor L2, secondary winding 3b, and IGBT Q14 into negative voltage terminal 2b. Furthermore, when IGBTs Q12 and Q13 are turned on, a current flows from positive voltage terminal 2a through IGBT Q12, secondary winding 3b, reactor L2, and IGBT Q13 into negative voltage terminal 2b. Accordingly, IGBTs Q11 to Q14 are controlled by control signals ϕ11, /ϕ11, ϕ12, and /ϕ12 to be turned on or off, so that AC power can be supplied to secondary winding 3b.

Furthermore, the effective values of AC fundamental wave voltages Va and Vb are caused to coincide with each other and phase difference θ between AC fundamental wave voltages Va and Vb are controlled, so that DC power can be supplied from DC circuit 5 through inverters 1 and 2 to DC circuit 6, and also that DC power can be supplied from DC circuit 6 through inverters 2 and 1 to DC circuit 5.

Figure 3:
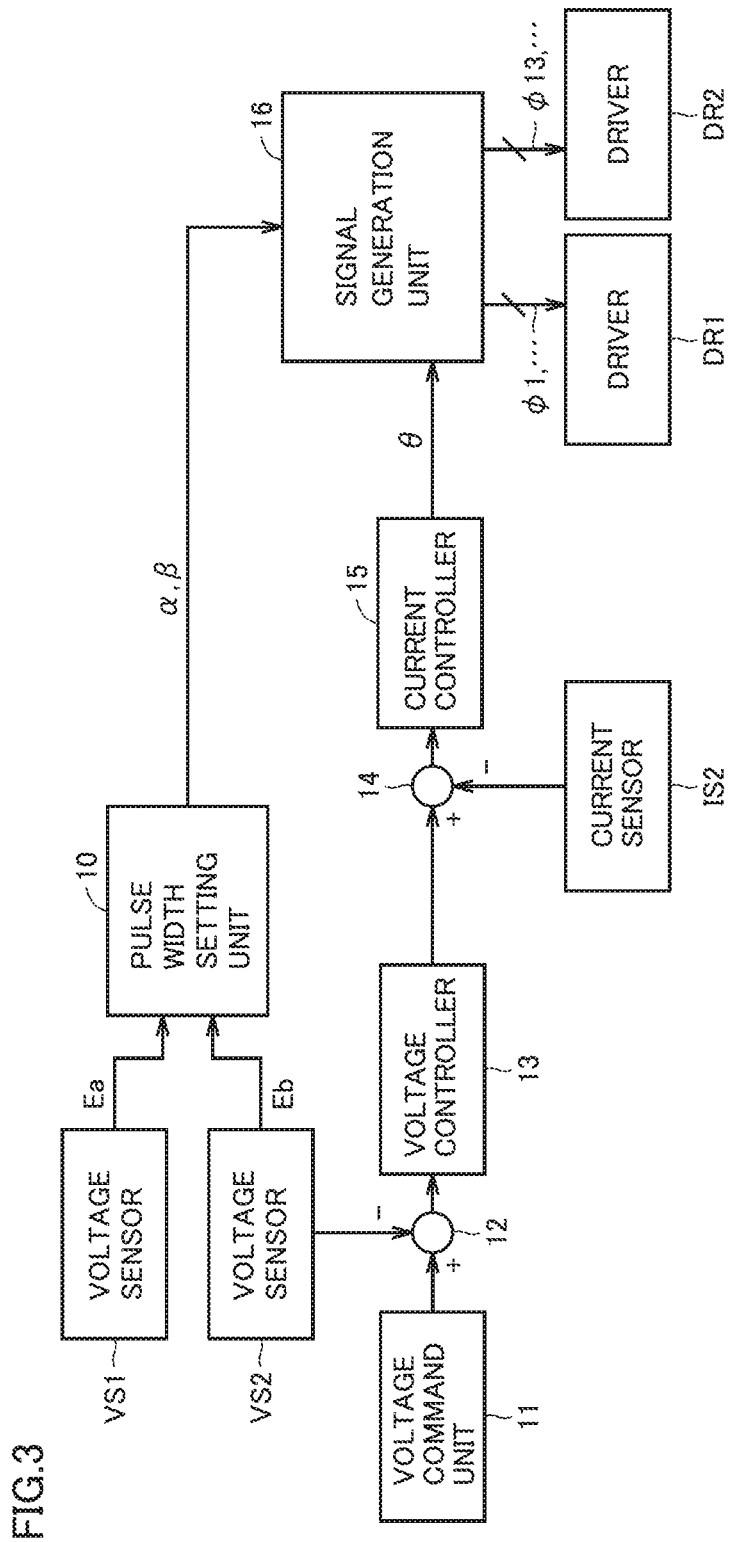
FIG. 3 is a block diagram showing a main part of a control circuit shown in FIG. 1.

FIG. 3 is a block diagram showing a part of control circuit 4 that is related to generation of control signals ϕ1, /ϕ1, ϕ2, /ϕ2, ϕ11, /ϕ11, ϕ12, and /ϕ12. It is to be noted that FIG. 3 shows a part used when DC power is supplied from DC circuit 5 to DC circuit 6. In addition, in the case where DC power is supplied from DC circuit 6 to DC circuit 5, voltage detectors VS1 and VS2 are replaced with each other while current detectors IS2 and IS1 are replaced with each other, for example, by a switching circuit.

In FIG. 3, control circuit 4 includes a pulse width setting unit 10, a voltage command unit 11, subtractors 12 and 14, a voltage controller 13, a current controller 15, and a signal generation unit 16. Based on DC voltage Ea between terminals T1 and T2 that is detected by voltage detector VS1 and DC voltage Eb between terminals T3 and T4 that is detected by voltage detector VS2, pulse width setting unit 10 sets pulse widths α and β (rad) of AC fundamental wave voltages Va and Vb such that the effective values of AC fundamental wave voltages Va and Vb output from inverters 1 and 2 coincide with each other.

The following is an explanation about the reason why pulse widths α and β (rad) of AC fundamental wave voltages Va and Vb are set such that the effective values of AC fundamental wave voltages Va and Vb coincide with each other. FIGS. 4(a) to 4(d) each are a diagram showing the relation between AC fundamental wave voltages Va and Vb. In FIGS. 4(a) to 4(d), ΔV shows a differential voltage between Va and Vb. I shows a current that is caused to flow by differential voltage ΔV between Va and Vb. VA and VB are effective values of Va and Vb, respectively.

As shown in FIGS. 4(a) and 4(b), in the case where VA=VB, the angle between AC fundamental wave voltages Va, Vb and current I is relatively small, and the power factor of current I is excellent relative to both Va and Vb. However, If pulse widths α and β (rad) are maintained uniformly without being controlled, ΔV is directed in the counterclockwise direction in accordance with an increase in effective value VB of the AC fundamental wave voltage (in this case, Vb) on the DC power receiving side, so that the power factor deteriorates.

For example, as shown in FIG. 4(c), in the case where VA=100, VB=120 and θ=10 degrees, the angle between AC fundamental wave voltages Va, Vb and current I increases, so that the power factor of current I deteriorates relative to both Va and Vb. Furthermore, as shown in FIG. 4(d), in the case where Ea=100, Eb=120 and θ=5 degrees, the angle between AC fundamental wave voltages Va, Vb and current I further increases, so that the power factor of current I further deteriorates relative to both Va and Vb.

Accordingly, it is considered that DC power is difficult to be transmitted and received when the difference between VA and VB is relatively large and θ is relatively small. Therefore, according to the invention of the present application, the pulse width (in this case, β) of the AC fundamental wave voltage (in this case, Vb) corresponding to a higher DC voltage (for example, Eb) of two DC voltages Ea and Eb is narrowed, to cause effective values VA and VB of AC fundamental wave voltages Va and Vb to coincide with each other.

In addition, examples of the method for improving a power factor include three methods shown in FIGS. 5(a) to 5(c). In the present first embodiment, on the condition that VA=VB, the phase of Va is fixed and the phase of Vb is delayed by θ, as shown in FIG. 5(a). In this case, the power factors of Va, Vb and I each exhibit cos(θ/2) that is excellent. Also, it goes without saying that the same results can be achieved even on the conditions that VA=VB, the phase of Va is advanced by θ/2, and the phase of Vb is delayed by θ/2.

Furthermore, when the power factors of Va and I are desired to be set at 1, the condition is set as VB=100/cos(20) in the case where θ=20 degrees and VA=100, as shown in FIG. 5(b). Furthermore, when the power factors of Vb and I are desired to be set at 1, the condition is set as VB=100 cos(20) in the case where θ=20 degrees and VA=100, as shown in FIG. 5(c).

FIGS. 6(a) and 6(b) each are a diagram showing waveforms of AC fundamental wave voltages Va and Vb in the case where DC voltages Ea and Eb are different. Particularly, FIG. 6(a) shows the case where θ=0, and FIG. 6(b) shows the case where θ>0. AC fundamental wave voltages Va and Vb are expressed by the following equations (1) and (2), respectively. It is to be noted that θ represents a phase difference (rad) between Va and Vb. Furthermore, on the condition that the frequencies of Va and Vb each are defined as f, then ωt=2 πft(rad).

$$Va=(4/\pi)Ea \cdot \sin(\alpha/2) \cdot \sin(\omega t+\theta/2) \quad (1)$$

$$Vb=(4/\pi)Eb \cdot \sin(\beta/2) \cdot \sin(\omega t-\theta/2) \quad (2)$$

As shown in FIGS. 6(a) and 6(b), in the case where Ea>Eb, then β=π, in which case the condition only has to be set as Eb=Ea·sin(α/2) in order to cause the effective value of Vb to coincide with each other. This consequently leads to α=2 sin$^{-1}$(Eb/Ea). In contrast, in the case where Ea<Eb, then α=π, in which case the condition only has to be set as Ea=Eb·sin(β/2) in order to cause the effective value of Va and the effective value of Vb to coincide with each other. This consequently leads to β=2 sin$^{-1}$(Ea/Eb).

Specifically, pulse width setting unit 10 calculates α from x=Eb/Ea and α=2 sin$^{-1}$(x), and calculates β from y=Ea/Eb and β=2 sin$^{-1}$(y). It is to be noted that a limiter is set such that each of x and y is 1 or less.

For example, in the case where Ea=150 and Eb=100, Eb/Ea=2/3 and Ea/Eb=3/2, which leads to x=2/3 and y=1, so that α=2 sin$^{-1}$(2/3) and β=π. Furthermore, in the case where Ea=100 and Eb=150, Eb/Ea=3/2 and Ea/Eb=2/3, which leads to x=1 and y=2/3, so that α=π and β=2 sin$^{-1}$(2/3).

Furthermore, FIG. 6(b) shows the case where θ>0 and the phase of Va is advanced more than Vb is. If θ<0, the phase of Vb is advanced more than Va is.

Referring back to FIG. 3, voltage command unit 11 generates a target voltage EbT of DC voltage Eb. Subtractor 12 calculates a deviation between target voltage EbT and DC voltage Eb that is detected by voltage detector VS2. Voltage controller 13 generates a current command value IT of the value obtained in accordance with the deviation between EbT and Eb calculated by subtractor 12. It is to be noted that this current command value IT is limited by the limiter to a prescribed value or less.

Subtractor 14 calculates a deviation between current command value IT generated in voltage controller 13 and current I detected by current detector IS2. Current controller 15 generates phase difference θ of the value obtained in accordance with the deviation between IT and I calculated by subtractor 14. It is to be noted that this phase difference θ is limited by the limiter to a prescribed value or less.

Based on pulse widths α and β set by pulse width setting unit 10 and phase difference θ generated in current controller 15, signal generation unit 16 generates control signals φ1, /φ1, φ2, /φ2 for inverter 1 and control signals φ11, /φ11, φ12, and /φ12 for inverter 2.

Figure 7:
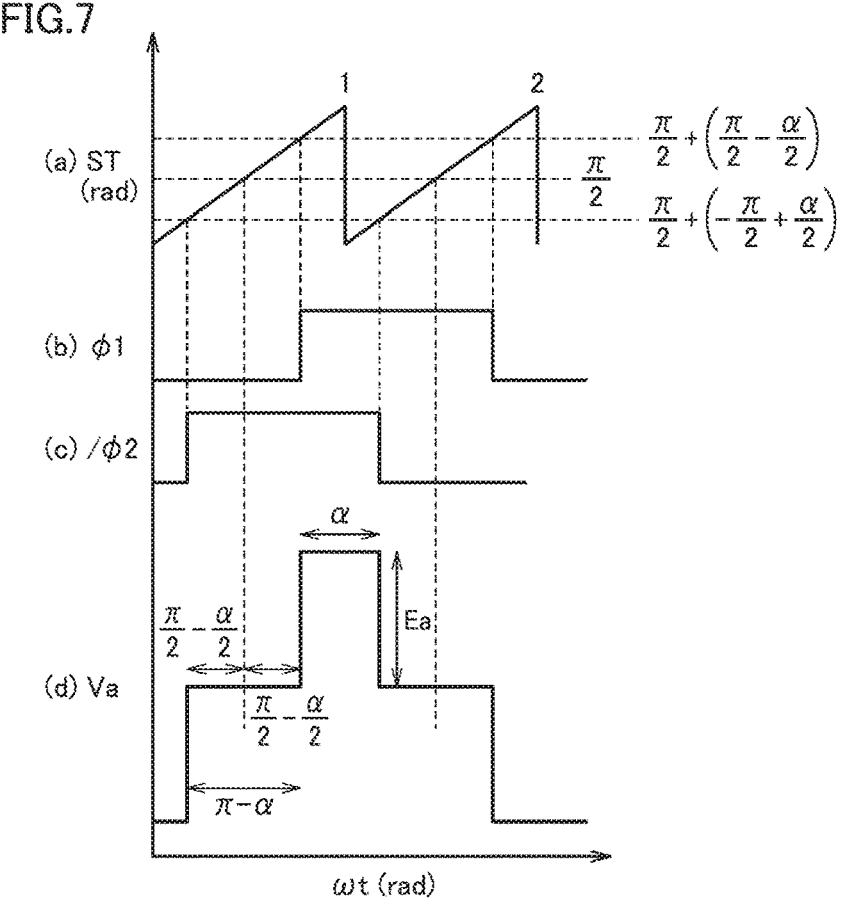
FIG. 7 is a diagram for illustrating the operation of a signal generation unit shown in FIG. 3.

Then, the method of generating control signals φ1, /φ1, φ2, /φ2, φ11, /φ11, φ12, and /φ12 will be hereinafter described. FIGS. 7(*a*) to 7(*d*) are time charts each showing the method of generating control signals φ1 and /φ2 in the case where θ=0. A sawtooth waveform signal ST having a frequency that is twice as high as the frequency of AC fundamental wave voltage Va is generated. It is assumed that sawtooth waveform signal ST oscillates with amplitudes between 0 and π, and one period of sawtooth waveform signal ST is defined as π.

AC fundamental wave voltage Va reaches Ea in the time period during which each of control signals φ1 and /φ2 is at an "H" level. Assuming that the angle width where Va=Ea is defined as a pulse width α, the angle width where Va=0 is π−α. The center angle during the time period where Va=0 coincides with the angle at which sawtooth waveform signal ST is π/2.

Furthermore, sawtooth waveform signal ST and a first reference signal S1=π/2+(π/2−α/2) cross each other in each period. When ST and S1 cross each other in the odd-numbered period, control signal φ1 is raised from the "L" level to the "H" level. When ST and S1 cross each other in the even-numbered period, control signal φ1 is lowered from the "H" level to the "L" level.

Furthermore, sawtooth waveform signal ST and a second reference signal S2=π/2+(−π/2+α/2) cross each other in each period. When ST and S2 cross each other in the odd-numbered period, control signal /φ2 is raised from the "L" level to the "H" level. When ST and S2 cross each other in the even-numbered period, control signal /φ12 is lowered from the "H" level to the "L" level.

In other words, sawtooth waveform signal ST having a frequency that is twice as high as the frequency of AC fundamental wave voltage Va, a first reference signal S1=π/2+(π/2−α/2), a second reference signal S2=π/2+(−π/2+α/2) only have to be generated, control signal φ1 only has to be generated based on the cross point between ST and S1, and control signal /φ2 only has to be generated based on the cross point between ST and S2.

Figure 8:
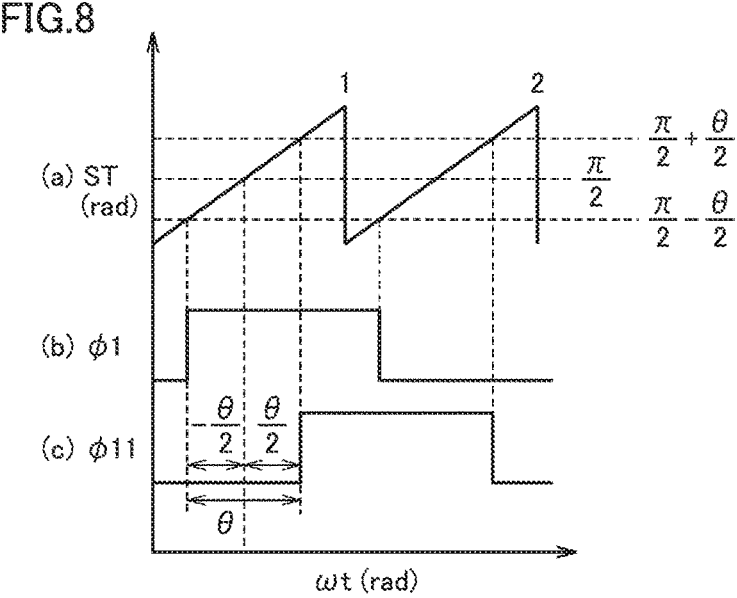
FIG. 8 is another diagram for illustrating the operation of the signal generation unit shown in FIG. 3.

FIGS. 8(*a*) to 8(*c*) each are a time chart showing a method of generating control signals φ1 and φ11 in the case where α=β=π. Sawtooth waveform signal ST having a frequency that is twice as high as the frequency of AC fundamental wave voltage Va is generated. It is assumed that sawtooth waveform signal ST oscillates with amplitudes between 0 and π, and one period of sawtooth waveform signal ST is defined as π.

The phase of control signal φ1 is advanced by θ from control signal φ11. The angle width in which control signal φ1 is at an "H" level and control signal φ11 is at an "L" level is defined as a phase difference θ. The center angle of the angle width in which control signal φ1 is at an "H" level and control signal φ11 is at an "L" level coincides with the angle at which sawtooth waveform signal ST is π/2.

In other words, sawtooth waveform signal ST having a frequency that is twice as high as the frequency of AC fundamental wave voltage Va, a first reference signal S1=π/2+(−θ/2), a third reference signal S3=π/2+(θ/2) only have to be generated, control signal φ1 only has to be generated based on the cross point between ST and S1, and control signal φ11 only has to be generated based on the cross point between ST and S3.

Then, the method of generating control signals φ1, /φ1, φ2, /φ2, φ11, /φ11, φ12, and /φ12 in a general situation will be hereinafter described. Sawtooth waveform signal ST mentioned above and first reference signals S1 to fourth reference signal S4 described below are generated.

$$S1=\pi/2+(-\theta/2+\pi/2-\alpha/2)[\text{rad}]$$

$$S2=\pi/2+(-\theta/2-\pi/2+\alpha/2)[\text{rad}]$$

$$S3=\pi/2+(\theta/2+\pi/2-\beta/2)[\text{rad}]$$

$$S4=\pi/2+(\theta/2-\pi/2+\beta/2)[\text{rad}]$$

The leading edge and the trailing edge of control signal φ1 are determined based at the cross point between ST and S1. The leading edge and the trailing edge of control signal /φ2 are determined based on the cross point between ST and S2. The leading edge and the trailing edge of control signal φ11 are determined based on the cross point between ST and S3. The leading edge and the trailing edge of control signal /φ12 are determined based on the cross point between ST and S4. For example, the leading edge is determined at the cross point in the odd-numbered period, and the trailing edge is determined at the cross point in the even-numbered period. Control signals φ1, /φ2, φ11, and /φ12 are inverted to thereby achieve control signals /φ1, φ2, /φ11, and φ12, respectively.

In the case where Eb>Ea, pulse width α of each of control signals φ1, /φ1, φ2, and /φ2 is fixed at π on the condition that α/2=π/2. In the case where Ea>Eb, pulse width β of each of control signals φ11, /φ11, φ12, and /φ12 is fixed at π on the condition that β/2=π/2. In the case where Ea=Eb, on the condition that α/2=β/2=π/2, pulse width α of each of control signals φ1, /φ1, φ2, and /φ2 is fixed at π while pulse width β of each of control signals φ11, /φ11, φ12, and /φ12 is fixed at π.

Figure 9:
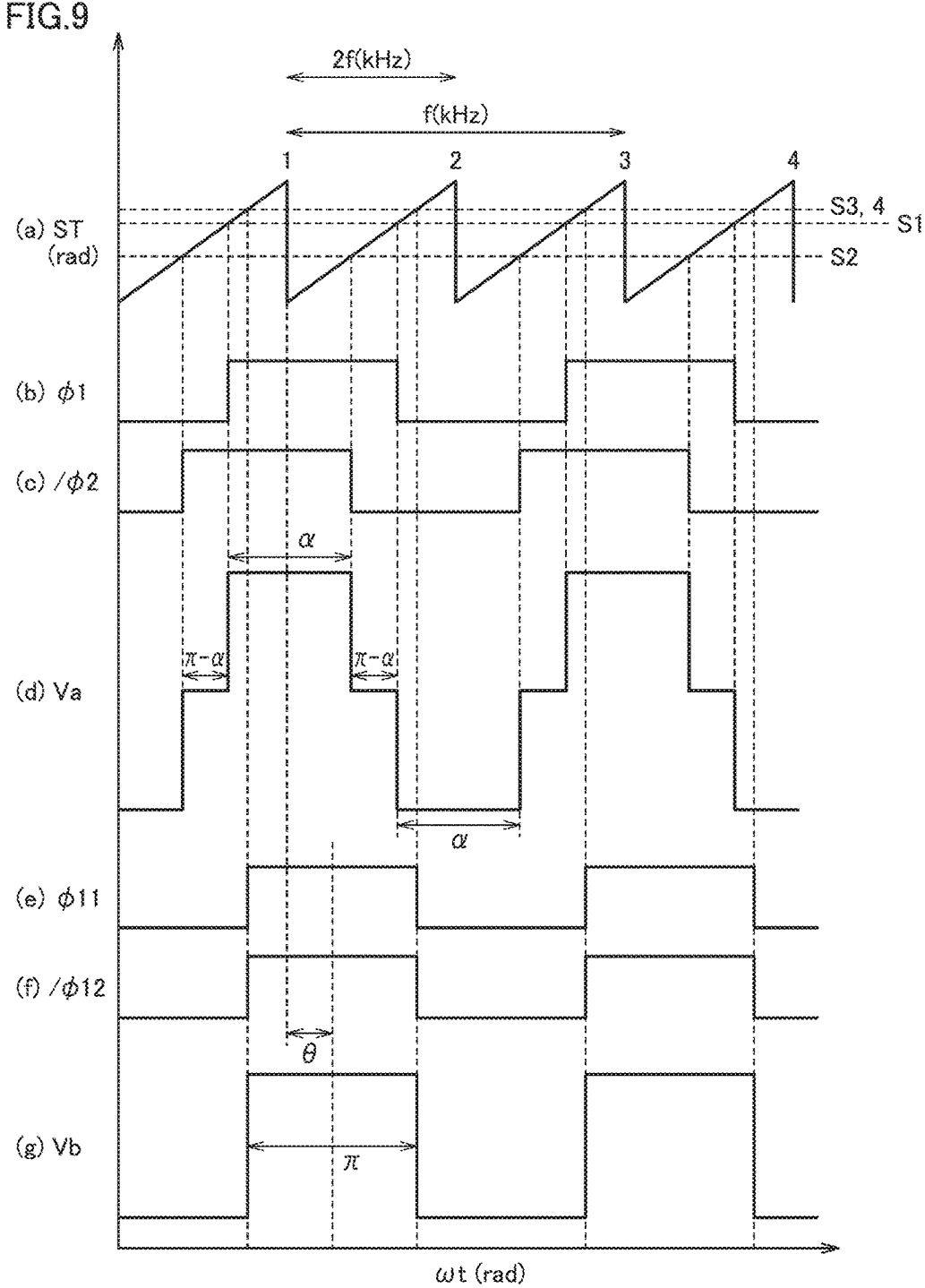
FIG. 9 is still another diagram for illustrating the operation of the signal generation unit shown in FIG. 3.

FIGS. 9(*a*) to 9(*g*) each are a time chart showing the method of generating control signals φ1, φ2, φ11, and /φ12 in the case where Ea>Eb. The above-mentioned sawtooth waveform signal ST is generated. Since Ea>Eb, pulse width β of each of control signals φ11 and /φ12 is fixed at π on the condition that β/2=π/2. Since β=π, then S3=S4=π/2+θ/2. S1 and S2 are as described above.

As shown in FIG. 9(*a*), the cross point between sawtooth waveform signal ST and each of first reference signal S1 to fourth reference signal S4 is obtained. As shown in FIGS. 9(*a*) and 9(*b*), control signal φ1 is raised at each odd-numbered cross point between ST and S1, and control signal φ1 is lowered at each even-numbered cross point between ST and S1. Control signal /φ1 is obtained by inverting control signal φ1.

As shown in FIGS. 9(*a*) and 9(*c*), control signal /φ2 is raised at each odd-numbered cross point between ST and S2, and control signal /φ2 is lowered at each even-numbered cross point between ST and S2. Control signal φ2 is obtained by inverting control signal /φ2.

As shown in FIGS. 9(b) to 9(d), AC fundamental wave voltage Va reaches +Ea when control signals ϕ1 and /ϕ2 each are at the "H" level, reaches −Ea when control signals ϕ1 and /ϕ2 each are at the "L" level, and reaches 0V when one of control signals ϕ1 and /ϕ2 is at the "H" level and the other of control signals ϕ1 and /ϕ2 is at the "L" level.

As shown in FIGS. 9(a) and 9(e), control signal ϕ11 is raised at each odd-numbered cross point between ST and S3, and control signal ϕ11 is lowered at each even-numbered cross point between ST and S3. Control signal /ϕ11 is obtained by inverting control signal ϕ11.

As shown in FIGS. 9(a) and 9(f), control signal /ϕ12 is raised at each odd-numbered cross point between ST and S4, and control signal /ϕ12 is lowered at each even-numbered cross point between ST and S4. Control signal ϕ12 is obtained by inverting control signal /ϕ12.

As shown in FIGS. 9(e) to 9(g), AC fundamental wave voltage Vb reaches +Ea when control signals ϕ11 and /ϕ12 each are at the "H" level, and reaches −Ea when control signals ϕ11 and /ϕ12 each are at the "L" level. Thereby, the effective values of AC fundamental wave voltages Va and Vb coincide with each other, so that the power factor is maintained at a relatively higher level. Since the phase of AC fundamental wave voltage Va is advanced by θ from the phase of AC fundamental wave voltage Vb, DC power is supplied from inverter 1 to inverter 2.

In the present first embodiment, the pulse width of AC fundamental wave voltage Va or Vb corresponding to a higher DC voltage of DC voltages Ea and Eb is narrowed to cause the effective values of Va and Vb to coincide with each other. After that, phase difference θ between AC fundamental wave voltages Va and Vb is set in accordance with the value and the direction of the current that is desired to flow. Accordingly, even when DC voltages Ea and Eb greatly fluctuate, DC power can be stably transmitted and received between DC circuits 5 and 6.

Specifically, even when DC voltage Ea (or Eb) falls greatly (for example, −20%) below the rated value and DC voltage Eb (or Ea) rises greatly (for example, +20%) above the rated value, DC power can be supplied from DC circuit 5 (or 6) to DC circuit 6 (or 5).

For example, in the case where the ratio of the number of turns of insulated transformer 3 is 1:1 and the rated values of DC voltages Ea and Eb each are 100V, DC power can be supplied from the Ea side to the Eb side even when Ea lowers to 80V and Eb rises to 120V. In addition, according to the conventional normal insulated DC/DC converter, power can be supplied when Ea is 100V and Eb is 70V to 80V, but power cannot be supplied when Eb is higher than 80V.

Furthermore, in the present first embodiment, the DC power transmitted and received between DC circuits 5 and 6 can be controlled linearly in a positive and negative range, and further, the flow direction of the power can be reversed instantaneously within several cosecs. Thereby, two DC circuits 5 and 6 with relatively large voltage fluctuation width are cooperated while being insulated from each other, so that a bidirectional smooth power interchange can be implemented, and also, the problem related to safety and EMI and the problem related to a withstand voltage can be solved by grounding isolation.

In addition, in the present first embodiment, pulse width α or β of AC fundamental wave voltage Va or Vb corresponding to a higher DC voltage of DC voltages Ea and Eb is narrowed to cause the effective values of Va and Vb to coincide with each other, but the present invention is not limited thereto. The pulse width of AC fundamental wave voltage Va. or Vb may be narrowed such that the difference between the effective values of Va and Vb is equal to or less than a prescribed value. Furthermore, pulse width α or β of AC fundamental wave voltage Va or Vb may be narrowed such that the ratio of the difference between the effective values of Va and Vb to the effective value of Va or Vb is equal to or less than several %.

Furthermore, in the present first embodiment, voltage detector VS1 detects DC voltage Ea between terminals T1 and T2, and voltage detector VS2 detects DC voltage Eb between terminals T3 and T4, but the present invention is not limited thereto, and DC voltages Ea and Eb may be detected by other methods. For example, the output AC voltages of inverters 1 and 2 may be captured in control circuit 4 through a signal transformer, the peak values of the captured AC voltages may be sampled, and DC voltages Ea and Eb may be detected indirectly from the sampled peak values.

Furthermore, although two reactors L1 and L2 are provided in the present first embodiment, one of two reactors L1 and L2 may be eliminated, or two reactors L1 and L2 may be eliminated in the case where insulated transformer 3 has a leakage inductance.

Furthermore, in the present first embodiment, control signals ϕ1, /ϕ1, ϕ2, and /ϕ2 are raised at the cross points between sawtooth waveform signal ST and reference signals S1 to S4, respectively, in each odd-numbered period of sawtooth waveform signal ST, and control signals ϕ1, /ϕ1, ϕ2, and /ϕ2 are raised at the cross points between sawtooth waveform signal ST and reference signals S1 to S4, respectively, in each even-numbered period of sawtooth waveform signal ST. However, the present invention is not limited to this, but the information related to the cross points between sawtooth waveform signal ST and reference signals S1 to S4 in each odd-numbered or even-numbered period may be stored, and control signals ϕ1, /ϕ1, ϕ2, and /ϕ2 may be generated based on the stored information.

For example, control signals ϕ1, /ϕ1, ϕ2, and /ϕ2 may be raised at the cross points between sawtooth waveform signal ST and reference signals S1 to S4, respectively, in each odd-numbered period of sawtooth waveform signal ST. Also, the information related to these cross points may be stored, and control signals ϕ1, /ϕ1, ϕ2, and /ϕ2 may be raised in each even-numbered period of sawtooth waveform signal ST based on the stored information. In this case, the waveforms of AC fundamental wave voltages Va and Vb can be rendered positively and negatively symmetrical, and bias magnetism in insulated transformer 3 can be prevented from occurring.

Second Embodiment

Figure 10:
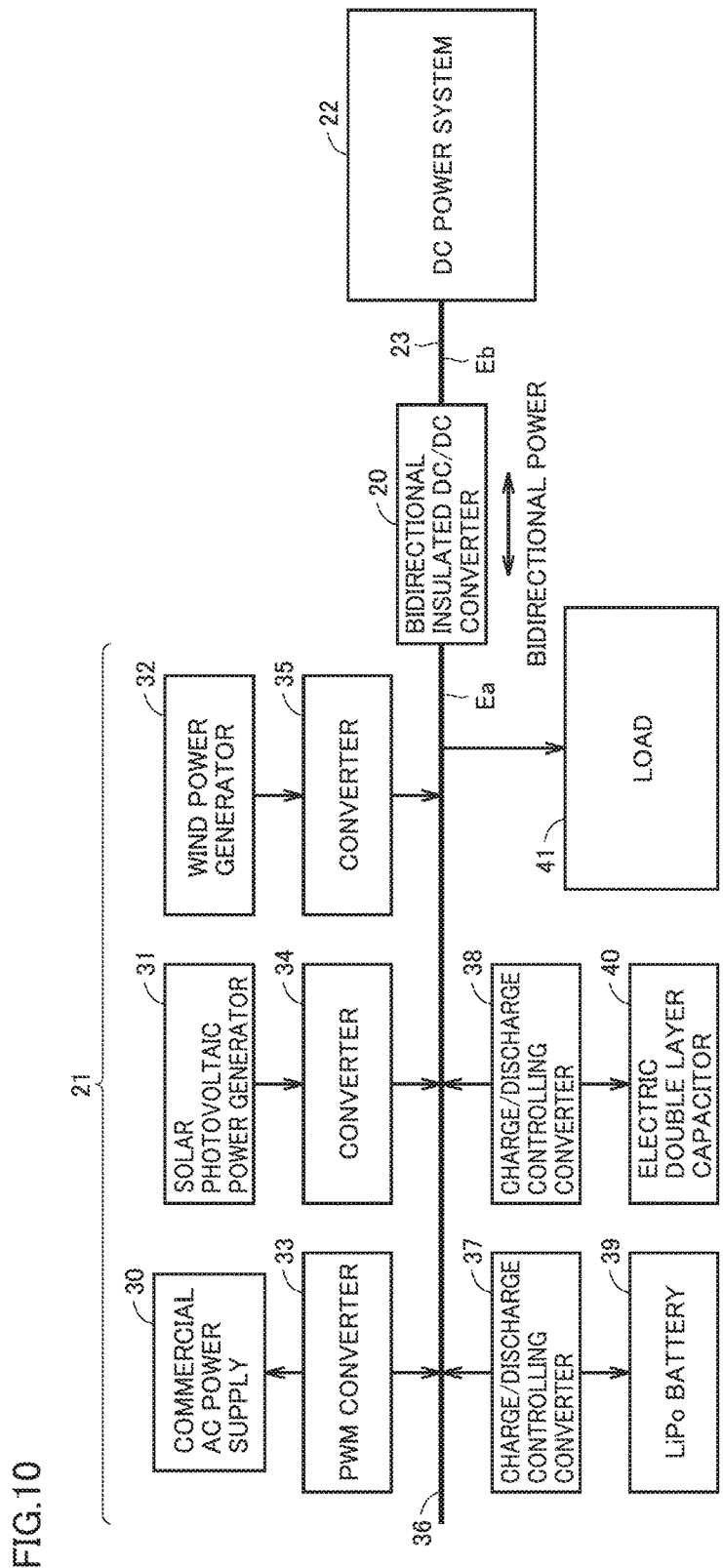
FIG. 10 is a block diagram showing the configuration of a smart network according to the second embodiment of the present invention.

FIG. 10 is a block diagram showing the configuration of a smart network according to the second embodiment of the present invention. In FIG. 10, this smart network includes: a bidirectional insulated DC/DC converter 20 having a configuration described in the first embodiment; and two DC power systems 21 and 22.

DC power system 21 includes a commercial AC power supply 30, a solar photovoltaic power generator 31, a wind power generator 32, a PWM converter 33, converters 34 and 35, a DC bus 36, a charge/discharge controlling converters 37 and 38, an LiPo battery 39, an electric double layer capacitor 40, and a load 41.

Commercial AC power supply 30 generates commercial AC power. PWM converter 33 converts the commercial AC power from commercial AC power supply 30 into DC power having a prescribed DC voltage Ea (for example, 300V), and supplies the converted power to DC bus 36. Furthermore, when the commercial AC power becomes insufficient, PWM converter 33 converts the DC power from DC bus 36 into AC power having a prescribed voltage at a commercial frequency, and supplies the converted power to commercial AC power supply 30.

Solar photovoltaic power generator 31 converts light energy from the sun into DC power. Converter 34 converts the DC power generated in solar photovoltaic power generator 31 into DC power having a prescribed DC voltage Ea, and supplies the converted power to DC bus 36. Wind power generator 32 converts the wind power into DC power. Converter 35 converts the DC power generated in wind power generator 32 into DC power having a prescribed DC voltage Ea, and supplies the converted power to DC bus 36.

When DC power is excessive in DC power system 21, charge/discharge controlling converter 37 extracts DC power from DC bus 36 and stores the extracted DC power in LiPo battery 39. When DC power is insufficient in DC power system 21, charge/discharge controlling converter 37 extracts DC power from LiPo battery 39 and supplies the extracted DC power to DC bus 36.

When DC power is excessive in DC power system 21, charge/discharge controlling converter 38 extracts DC power from DC bus 36 and stores the extracted DC power in electric double layer capacitor 40. When DC power is insufficient in DC power system 21, charge/discharge controlling converter 38 extracts DC power from electric double layer capacitor 40 and stores the extracted DC power in DC bus 36.

Load 41 represents a general house, an office, plant facilities, electric vehicle charging facilities, and the like, and consumes DC power from DC bus 36. DC power system 22, which has the same configuration as that of DC power system 21, includes a DC bus 23 maintained at a prescribed DC voltage Eb (for example, 1000V).

Bidirectional insulated DC/DC converter 20, which has been described in the first embodiment, transmits and receives DC power between DC buses 36 and 23. DC bus 36 includes a DC positive bus and a DC negative bus connected to terminals T1 and T2, respectively. DC bus 23 includes a DC positive bus and a DC negative bus connected to terminals T3 and T4, respectively.

Bidirectional insulated DC/DC converter 20 serves to narrow the pulse width of AC fundamental wave voltage Vb corresponding to a higher DC voltage (Eb in the present second embodiment) of DC voltages Ea and Eb to thereby cause the effective values of Va and Vb to coincide with each other. After that, bidirectional insulated DC/DC converter 20 sets phase difference θ between AC fundamental wave voltages Va and Vb in accordance with the value and the direction of the current that is desired to flow. When DC power is supplied from DC power system 21 to DC power system 22, the phase of Va is advanced more than Vb is. When DC power is supplied from DC power system 22 to DC power system 21, the phase of Vb is advanced more than Va is.

For example, in the case where DC power becomes insufficient due to a failure of commercial AC power supply 30 in DC power system 21, DC power is supplied from DC power system 22 to DC power system 21. Accordingly, the present smart network also has a function of an uninterruptible power supply system.

In the present second embodiment, two DC power systems 21 and 22 are coupled by bidirectional insulated DC/DC converter 20. Accordingly, even when DC voltages Ea and Eb on DC power systems 21 and 22 greatly vary, DC power can be stably transmitted and received between DC power systems 21 and 22.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

T1, T3 positive voltage terminal, T2, T4 negative voltage terminal, IS1, IS2 current detector, VS1, VS2 voltage detector, C1, C2 capacitor, 1, 2 inverter, L1, L2 reactor, 3 insulated transformer, 4 control circuit, DR1, DR2 driver, 5, 6 DC circuit, Q1 to Q4, Q11 to Q14 IGBT, D1 to D4, D11 to D14 diode, 10 pulse width setting unit, 11 voltage command unit, 12, 14 subtractor, 13 voltage controller, 15 current controller, 16 signal generation unit, 20 bidirectional insulated DC/DC converter, 21, 22 DC power system, 30 commercial AC power supply, 31 solar photovoltaic power generator, 32 wind power generator, 33 PWM converter, 34, 35 converter, 23, 36 DC bus, 37, 38 charge/discharge controlling converter, 39 LiPo battery, 40 electric double layer capacitor, 41 load.

The invention claimed is:

1. A bidirectional insulated DC/DC converter for transmitting and receiving DC power between a first DC circuit and a second DC circuit, the bidirectional insulated DC/DC converter comprising:
a first inverter configured to generate a first AC fundamental wave voltage based on a first DC voltage received from the first DC circuit;
a second inverter configured to generate a second AC fundamental wave voltage that is equal in frequency to the first AC fundamental wave voltage based on a second DC voltage received from the second DC circuit;
an insulated transformer including a primary winding and a secondary winding insulated from each other and configured to receive the first AC fundamental wave voltage and the second AC fundamental wave voltage, respectively; and
circuitry configured to:
determine a pulse width of at least one of the first and second AC fundamental wave voltages based on $\sin^{-1}(A)$, 'A' being a term including a ratio of the first DC voltage to the second DC voltage;
determine a phase difference between the first and second AC fundamental wave voltages such that a desired DC power is transmitted and received between the first and second DC circuits; and
generate a control signal for each of the first and second inverters based on the determined pulse width and the determined phase difference.

2. The bidirectional insulated DC/DC converter according to claim 1, wherein
when the first DC voltage is higher than the second DC voltage, the circuitry configured to narrow the pulse width of the first AC fundamental wave voltage, and
when the second DC voltage is higher than the first DC voltage, the circuitry configured to narrow the pulse width of the second AC fundamental wave voltage.

3. The bidirectional insulated DC/DC converter according to claim 2, wherein, on conditions that the first and second DC voltages are defined as Ea and Eb, respectively, and
that the pulse widths of the first and second AC fundamental wave voltages are defined as α and β, respectively,
the circuitry is configured to set $\alpha = 2\sin^{-1}(Eb/Ea)$ and $\beta = \pi$ when $Ea > Eb$, and $\alpha = \pi$ and $\beta = 2\sin^{-1}(Ea/Eb)$ when $Eb > Ea$.

4. The bidirectional insulated DC/DC converter according to claim 3, wherein
on a condition that the phase difference between the first and second AC fundamental wave voltages is defined as θ,
the circuitry is configured to
generate a sawtooth waveform signal that changes from 0 to π at a frequency that is twice as high as a frequency of each of the first and second AC fundamental wave voltages, $S1 = \pi/2 + (-\theta/2 + \pi/2 - \alpha/2)$ that is a first reference signal, $S2 = \pi/2 + (-\theta/2 - \pi/2 + \alpha/2)$ that is a second reference signal, $S3 = \pi/2 + (\theta/2 + \pi/2 - \beta/2)$ that is a third reference signal, and $S4 = \pi/2 + (\theta/2 - \pi/2 + \beta/2)$ that is a fourth reference signal, generate a first control signal and a second control signal for the first inverter based on cross points between the sawtooth waveform signal and the first and second reference signals, respectively, and
generate a third control signal and a fourth control signal for the second inverter based on cross points between the sawtooth waveform signal and the third and fourth reference signals, respectively.

5. The bidirectional insulated DC/DC converter according to claim 4, wherein
the circuitry is configured to
change the first to fourth control signals from a first logic level to a second logic level at the cross points between the sawtooth waveform signal and the first to fourth reference signals, respectively, in an odd-numbered period of the sawtooth waveform signal, and
change the first to fourth control signals from the second logic level to the first logic level at the cross points between the sawtooth waveform signal and the first to fourth reference signals, respectively, in an even-numbered period of the sawtooth waveform signal.

6. The bidirectional insulated DC/DC converter according to claim 4, wherein
the circuitry is configured to
change the first to fourth control signals from a first logic level to a second logic level at the cross points between the sawtooth waveform signal and the first to fourth reference signals, respectively, in an odd-numbered period of the sawtooth waveform signal, and stores information related to the cross points, and
based on the stored information, change the first to fourth control signals from the second logic level to the first logic level in an even-numbered period of the sawtooth waveform signal.

7. The bidirectional insulated DC/DC converter according to claim 1, further comprising a first voltage detector and a second voltage detector configured to detect the first DC voltage and the second DC voltage, respectively, wherein
the circuitry is configured to set the pulse width of each of the first and second AC fundamental wave voltages based on detection results of the first and second voltage detectors.

8. The bidirectional insulated DC/DC converter according to claim 1, further comprising at least one of:
a first reactor having one terminal for receiving the first AC fundamental wave voltage and the other terminal connected to one terminal of the primary winding; and
a second reactor having one terminal receiving the second AC fundamental wave voltage and the other terminal connected to one terminal of the secondary winding.

9. A smart network comprising:
the bidirectional insulated DC/DC converter according to claim 1; and
the first DC circuit and the second DC circuit,
the first DC circuit and the second DC circuit being a first DC power system and a second DC power system, respectively.

10. The smart network according to claim 9, wherein
each of the first and second DC power systems includes
a DC bus connected to the first inverter or the second inverter,
a DC power supply configured to supply DC power to the DC bus,
a load driven by the DC power from the DC bus, and
a power storage device connected to the DC bus and storing the DC power.

11. The bidirectional insulated DC/DC converter according to claim 1, wherein the term 'A' equals Eb/Ea or Ea/Eb, Ea representing the first DC voltage, and Eb representing the second DC voltage.

* * * * *

UNITED STATES PATENT AND TRADEMARK OFFICE
CERTIFICATE OF CORRECTION

| | |
|---|---|
| PATENT NO. | : 10,044,281 B2 |
| APPLICATION NO. | : 15/021907 |
| DATED | : August 7, 2018 |
| INVENTOR(S) | : Kazunori Sanada et al. |

Page 1 of 1

It is certified that error appears in the above-identified patent and that said Letters Patent is hereby corrected as shown below:

On the Title Page

Item (73), the Assignee's information is incorrect. Item (73) should read:
--(73) Assignee: TOSHIBA MITSUBISHI-ELECTRIC INDUSTRIAL SYSTEMS CORPORATION, Chuo-ku (JP);
The Ritsumeikan Trust, Kyoto-shi (JP)--

Signed and Sealed this
Twenty-eighth Day of May, 2019

Andrei Iancu
*Director of the United States Patent and Trademark Office*